US008975558B2

(12) United States Patent
Stava et al.

(10) Patent No.: US 8,975,558 B2
(45) Date of Patent: Mar. 10, 2015

(54) SELECTOR DEVICE FOR ELECTRIC ARC WELDER

(75) Inventors: Elliott K. Stava, Sagamore Hills, OH (US); William T. Matthews, Chesterland, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2714 days.

(21) Appl. No.: 11/114,683

(22) Filed: Apr. 27, 2005

(65) Prior Publication Data

US 2006/0243716 A1    Nov. 2, 2006

(51) Int. Cl.
*B23K 9/10* (2006.01)
*B23K 9/09* (2006.01)

(52) U.S. Cl.
CPC ..................... *B23K 9/093* (2013.01)
USPC ............. 219/130.5; 219/130.1; 219/132; 219/137 R; 219/130.21; 219/74

(58) Field of Classification Search
CPC ........................................... B23K 9/093
USPC ........... 219/130.1, 130.5, 137 PS, 130.21, 219/130.33, 103.01, 74, 130.51, 132, 137 R, 219/136
See application file for complete search history.

(56) References Cited

U.S. PATENT DOCUMENTS

| | | | | |
|---|---|---|---|---|
| 4,442,340 A * | 4/1984 | Kawabata et al. | ...... | 219/137 PS |
| 4,529,864 A * | 7/1985 | Bennett | ..................... | 219/137.71 |
| 5,278,390 A | 1/1994 | Blankenship | | |
| 5,388,031 A * | 2/1995 | Satoh | ............................ | 363/149 |
| 5,747,773 A * | 5/1998 | Griffin et al. | .............. | 219/130.1 |
| 5,991,180 A * | 11/1999 | Vogel et al. | ..................... | 363/89 |
| 6,002,104 A * | 12/1999 | Hsu | .............................. | 219/130.5 |
| 6,015,964 A * | 1/2000 | Baker | ...................... | 219/130.33 |
| 6,055,161 A * | 4/2000 | Church et al. | .................. | 363/22 |
| 6,093,906 A | 7/2000 | Nicholson et al. | | |
| 6,111,216 A | 8/2000 | Stava | | |
| 6,160,241 A | 12/2000 | Stava | | |
| 6,207,929 B1 | 3/2001 | Stava et al. | | |
| 6,329,636 B1 * | 12/2001 | Geissler | ..................... | 219/130.1 |
| 6,365,874 B1 | 4/2002 | Stava | | |
| 6,376,802 B1 * | 4/2002 | Tong et al. | ............. | 219/137 PS |
| 6,570,129 B1 * | 5/2003 | Samodell | ................. | 219/130.21 |
| 6,636,776 B1 * | 10/2003 | Barton et al. | ................. | 700/169 |

(Continued)

OTHER PUBLICATIONS

U.S. Appl. No. 11/051,196, filed Feb. 7, 2005, Kooken et al.

*Primary Examiner* — Dana Ross
*Assistant Examiner* — Ket D Dang
(74) *Attorney, Agent, or Firm* — Hahn Loeser & Parks LLP; Brendan E. Clark (57) ABSTRACT

An electric arc welder for creating an arc welding process between an electrode and a workpiece where the welder comprises a preregulator having a first DC signal as an input and a regulated second DC signal as an output, an unregulated isolation inverter to convert the regulated second DC signal into a DC power signal and a weld control stage for converting the DC power signal into a welding signal. A controller causes the weld control stage to conform the welding signal into a waveform to provide welding process between the electrode and the workpiece, which controller has an output control signal regulated to produce a selected waveform or waveforms and the polarity of the waveform or waveforms. A device selects one of several stored welding processes as a program and a corresponding polarity for outputting by the controller.

29 Claims, 4 Drawing Sheets

(56) References Cited

U.S. PATENT DOCUMENTS

| | | | |
|---|---|---|---|
| 6,660,965 B2 * | 12/2003 | Simpson | 219/130.01 |
| 6,700,097 B1 | 3/2004 | Hsu et al. | |
| 6,717,107 B1 | 4/2004 | Hsu | |
| 6,717,108 B2 | 4/2004 | Hsu | |
| 6,734,394 B2 | 5/2004 | Hsu | |
| 6,847,008 B2 * | 1/2005 | Myers et al. | 219/130.51 |
| 6,858,818 B2 | 2/2005 | Knoener | |
| 6,870,132 B2 | 3/2005 | Stava | |
| 2002/0190044 A1 * | 12/2002 | Leisner et al. | 219/133 |
| 2005/0072761 A1 * | 4/2005 | Colvin et al. | 219/74 |
| 2006/0037953 A1 * | 2/2006 | Matthews et al. | 219/133 |

\* cited by examiner

SELECTOR DEVICE FOR ELECTRIC ARC WELDER

The present invention relates to the field of electric arc welding and more particularly to a novel selector device for use in electric arc welders of the type controlled by waveform profile signals and polarity signals.

INCORPORATION BY REFERENCE

The present invention is primarily applicable for electric arc welders which have the capabilities of providing an AC output welding process, as well as DC negative and DC positive processes. Such welders are common and are illustrated in Stava U.S. Pat. No. 6,111,216; Stava U.S. Pat. No. 6,207,929; Stava U.S. Pat. No. 6,365,874; and, Stava U.S. Pat. No. 6,870,132. This type of electric arc welder can perform an AC welding process or a selected DC welding process. Furthermore, the welders are controlled by a waveform profile signal that is processed by a pulse width modulator to control the waveform profile of the welding process, whether it is an AC process or a DC process. These prior art patents are incorporated by reference herein to illustrate the type of electric arc welder to which the present invention is particularly directed. Consequently, the actual construction of the welder or its power source is not necessary to understand the present invention. As indicated, the welding process performed by the electric arc welder includes a specific polarity whether AC, DC negative or DC positive. A waveform technology control system is well known in the art and was pioneered over the years by The Lincoln Electric Company of Cleveland, Ohio. Many patents relate to this waveform control technology for controlling the actual waveform of the welding process irrespective of the polarity used in the welding process. The patents incorporated by reference above describe this waveform technology. Furthermore there are many other patents disclosing waveform technology of the type to which the present invention is particularly applicable. Blankenship U.S. Pat. No. 5,278,390, Nicholson U.S. Pat. No. 6,093,906, Stava U.S. Pat. No. 6,160,241; Hsu U.S. Pat. No. 6,700,097 Hsu U.S. Pat. No. 6,717,107; Hsu U.S. Pat. No. 6,717,108; Hsu U.S. Pat. No. 6,734,374 and Myers U.S. Pat. No. 6,847,008 represent this waveform generator or wave shaper to control the actual waveform used in a welding process, irrespective of the polarity selected for the process.

There are several pending patent applications which explain technology relevant to the present invention. For completeness, prior application Ser. No. 110-51196 filed in February 2005 is also incorporated by reference herein, not as prior art, but as explanatory information directed to a general type of electric arc welders to which the present invention is directed. A prior art select panel is shown in Blankenship U.S. Pat. No. 5,278,390 and Knoener U.S. Pat. No. 6,858,818 where limited selection can be made, but used for other purposes. These patents are incorporated by reference as background technology.

BACKGROUND OF INVENTION

The various electric arc welders incorporated by reference herein and other electric arc welders control the welding process between the electrode and workpiece by a waveform and a polarity according to the requirements of the particular welding process. These requirements may also change according to whether solid wire or cored wire is used and based on the diameter of the wire. Furthermore, the wire feed speed (WFS) is adjusted according to the particular welding process being performed by the electric arc welder. In the past, electric arc welders have been primarily developed for a dedicated welding process with parameters adjusted to change the process as desired by the welding engineer. However, with the advent of multi-purpose of welders of the type incorporated by reference herein, there has been no universal control arrangement to select one of several welding processes for the particular welders being developed using waveform technology and polarity signals. The different processes have been loaded into the welder by the welding engineer in a manner not necessarily giving universality to the newly developed electric arc welders.

The present invention relates to a novel device for selecting the welding process, as well as the polarity, from a single control module that is consistent in its ability to output waveforms and polarity information or signals to select one of several unique welding processes. When the term one of several welding processes is used, it means different types of welding processes such as MIG, MAG, stick, subarc and TIG, to name the basic processes. The invention relates to a select device usable for a three stage power source capable of waveform technology and AC or DC operation, as well as such a three stage welder with a dual mode chopper for the output stage or an inverter for the output stage. Such inverter has capabilities for performing AC and DC operations, as well as the capability of adjusting the shape of the waveform by a waveform signal. These types of electric arc welders do not have a selector device of the type to which the present invention is directed.

THE INVENTION

In accordance with the primary aspect of the present invention there is provided an electric arc welder for creating an arc welding process between an electrode and workpiece. The welder includes a preregulator having a first DC signal as an input and a regulated second DC signal as an output. An unregulated isolation inverter is used to convert the regulated second DC signal into a DC power signal so that a weld control stage with appropriate parameter feedback signals is used to convert the DC power signal into a welding signal. This type of welder includes a controller for causing the weld control stage to form the welding signal into a waveform to provide a welding process between the electrode and the workpiece. The controller has an output control signal regulated to produce a selected waveform or waveforms and the polarity of the waveform or waveforms. A selector device is used to select one of several stored welding processes and a selected polarity for outputting by the controller.

In accordance with another aspect of the present invention, the several processes include MIG, stick and subarc welding. The selector device controls the waveform or waveforms based upon the type of electrode and/or the diameter of the electrode. Thus, the waveform is modified according to whether the electrode is cored wire or solid wire.

The invention relates to a three stage power source, which is not prior art to the present invention, but is different than prior art electric arc welders. Thus, the primary aspect of the present invention is providing a selector device as defined above for a three stage electric arc welder. The same selector can be used for a welder where the output stage is a dual mode chopper. A dual mode chopper for welding is also not prior art, but is employed for AC welding, DC positive welding and DC negative welding. Two separate choppers are combined into one output stage wherein the choppers can be operated alternately or in DC mode having a selected polarity. All of these novel electric arc welders are improved by the present invention which is directed to a separate selector device usable for electric arc welders now being developed and some existing welders.

The primary object of the present invention is the provision of a selector device for selecting the waveform and polarity of one of several types of welding processes to be used with a three stage power source or a power source with a dual mode output chopper. In this manner, a three stage power source for welding or a welder with an output dual mode chopper stage is made extremely versatile so that the selector device can select the actual welding process. The type of electrode is used to set the waveforms and/or polarity information to perform a selected one of several possible types of electric arc welding processes.

Yet another object of the present invention is the provision of a selector device, as defined above, which selector device outputs waveform signals and polarity signals to a controller that is used for an electric arc welder having AC and DC capabilities so that diverse types of welding processes can be performed by the electric arc welder merely by the output of the novel selector device.

These and other objects and advantages will become apparent from the following description taken together with the accompanying drawings.

PREFERRED EMBODIMENT

Figure 1:
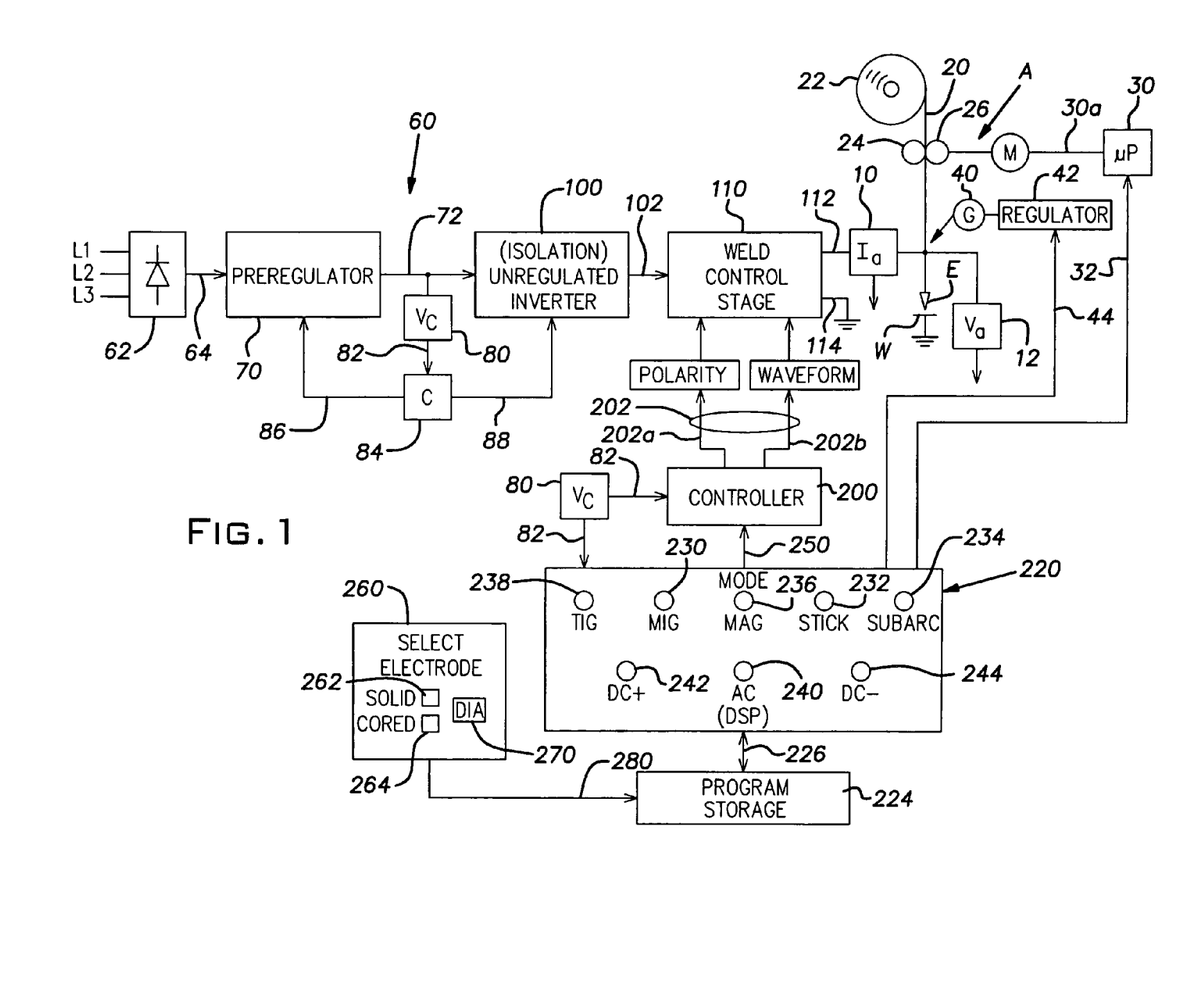
FIG. 1 is a combined wiring diagram and block diagram illustrating the preferred embodiment of the present invention.

In FIG. 1, electric arc welder A performs a welding process between electrode E and workpiece W. Arc current $I_a$ is sensed by shunt 10 and arc voltage $V_a$ is determined by circuit 112. The arc current and arc voltage are used as feedback weld parameters for controlling the welding process so that the desired waveform selected for the process is used in the welding operation. In accordance with standard practice, a welding wire 20 supplied by reel 22 is driven by rolls 24, 26 through motor M at a wire feed speed set by the signal on output line 30a of microprocessor 30. This signal is caused by the wire feed speed signal on line 32. Welder A pulls wire 20 from spool 22 and directs the wire, as electrode E, toward workpiece W. The wire feed speed is controlled by motor M and changes according to the requirements of the welding process. In accordance with some welding processes, inert gas from supply 40 is used in accordance with setting of regulator 42 controlled by the information on line 44. The information on line 44 selects the desired type of gas and regulates the volume of gas. The electric arc welding process between electrode E and workpiece W is a series of waveforms either AC or DC which have a profile controlled in accordance with the desired type of welding process, such as MIG, MAG, stick and subarc to name the basic types. Of course, if TIG welding is used, electrode E is a fixed electrode and does not move toward the workpiece. Stick welding does not use a reel 22, but involves a rigid solid wire electrode that is moved toward the workpiece by an operator. All of these welding processes are schematically represented as operations of electric arc welder A.

In accordance with an aspect of the invention, the electric arc welder has a power source 60 with an input rectifier 62 whereby three phase or single phase line voltage is rectified by rectifier 62 to produce a first DC signal on line 64. Preregulator 70, which normally includes a power factor correcting converter, such as a buck converter, converts the first DC signal on line 64 to an output regulated second DC signal on line 72. This second DC signal is provided to the input of an isolation, unregulated inverter forming the power stage. Thus, power source 60 a three stage power source instead of a normal two stage power source used for welding. Preregulator 70 and inverter 100 are controlled by a voltage, which control voltage is provided by the second DC signal on line 72 as indicated by converter 80, which is normally a buck converter. This buck converter has an output 82 directed to controller 84 for directing control voltage to both the preregulator and inverter. Control voltage on line 86 is used by the preregulator, whereas control voltage on line 88 is used by the unregulated inverter 100. The unregulated inverter power stage has a fixed phase angle so that there is no adjustment or regulation for developing a welding signal. Output lead 102 of inverter 100 is at a fixed DC power signal level. To regulate the power signal, an output weld control stage 110 is provided. This stage has an output lead 112 and an output lead 114 to direct the waveform or waveforms at the desired polarity to the actual welding operation. To control the welding operation there is provided a standard controller 200 having an output signal 202 divided into a waveform signal 202a and a polarity signal 202b. These two signals control the waveform at any given time across electrode E and workpiece W. Of course, controller 200 requires a control voltage which is provided by line 82 from buck converter 80. This same control voltage is provided to selector device 220 constructed in accordance with the present invention. This selector device includes a storage module 224 for storing a large number of readable programs, each program having a set of waveforms and polarity data. A program is selected by device 220 with communication line 226.

Device 220 interrogates the digital information in storage module 224 according to the setting at the face of selector 220. Buttons 230, 232 and 234 are depressed so device 220 retrieves a particular program from storage module 224 based upon the actuation of one of these buttons. The three buttons mentioned are the primary welding operations to be performed by electric arc welder A. In accordance with an aspect of the invention, MAG welding can be selected by device 220 or TIG welding can be selected. This is done by buttons 236, 238, respectively. After the type of welding operation is selected by device 220 using the face of this device, the polarity information is also selected. Button 240 is depressed for an AC welding operation. Thus, by selecting button 230 and button 240, an AC MIG welding process will be performed bu welder A. Communication line 226 loads the digital information from storage module 224 through line 226 onto the internal memory of device 220. In the example, the program information is for a MIG welding process with an AC waveform. This information or program is communicated to controller 200 through line 250, which line is the output signal of device 222. The device also has a control voltage from line 82. Storage module 224 and selector device 220 are digital and are normally a DSP, although a microprocessor or computer can be used as the internal processor of device 220.

In another aspect of the invention the type of electrode used in the welding process is a factor in selecting a program stored in module 224. This further feature uses an auxiliary electrode selector module 260. When a solid electrode is used button 262 is depressed. To select a cored wire, button 264 is depressed. The diameter of the wire is set by menu 270. Thus, the information on line 280 to storage module 224 indicates the type of electrode to be used and the size of the electrode. This information is employed for finalizing selection of a program stored in module 224. In this manner, electric arc welder A performs a desired welding operation at the desired polarity as determined by the setting of novel selector device 220. The weld parameters, such as current and voltage, are then adjusted in accordance with standard practice to modulate the actual process being performed as determined by the program data on line 250.

Figure 2:
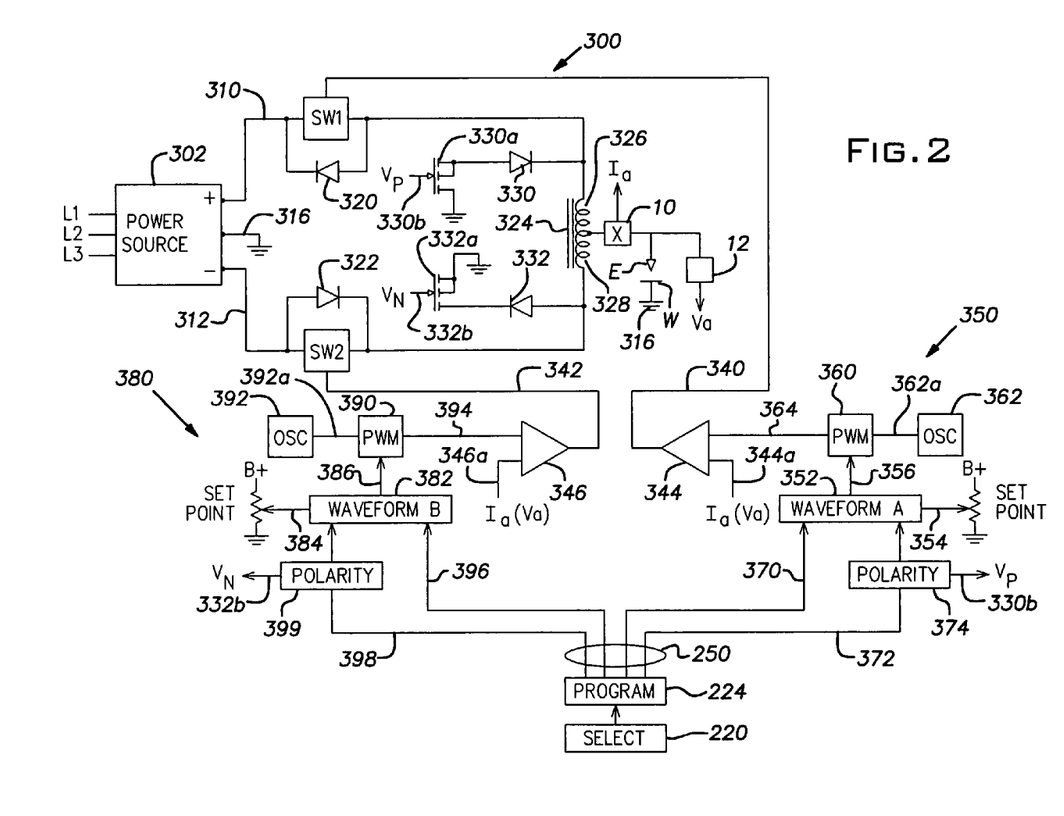
FIG. 2 is a wiring diagram of a particular electric arc welder using the preferred embodiment of the present invention as illustrated in FIG. 1.

Selector device 220 directs selected programs from memory storage module 224 to line 250 for use by electric arc welder 300, as shown in FIG. 2. This welder is of the type illustrated in Stava U.S. Pat. No. 6,870,132 incorporated by reference herein. Power source 302 has output positive and negative leads 310, 312, respectively. The power source is grounded at lead 316. Positive switch SW1 has an anti-parallel diode 320. Negative switch SW2 has an anti-parallel diode 322. The output from the two switches are connected to the ends of center tapped inductor 324 having positive section 326 and negative section 328. Freewheeling diodes 330, 332 are activated by switches 330a, 332a upon receiving a gate signal on lines 330b, 332b. Positive power gate 340 operates power switch SW1, while negative power gate 342 operates power switch SW2. The waveforms for the positive and negative switches is determined by a system schematically represented as analog comparators 344, 346. Selector device 220 outputs a particular selected program from storage module 324 as in FIG. 1. The logic on output line 250 controls either the positive system 350 or the negative system 380, both of which are performed by controller 200 as shown in FIG. 1. The use of two separate control systems is illustrative in nature; however, normally the systems would be integrated and processed as a single digital architecture. As illustrated, system 350 includes waveform generator 352 with a set point potentiometer 354 and an output line 356 for controlling pulse width modulator 360 operated at a high frequency, such as over 20 kHz, by oscillator 362. The high frequency pulses appear in output line 362a for driving pulse width modulator 360 in accordance with the logic on line 356 to produce a desired waveform profile as digital data on line 364. Schematically illustrated digital comparator 344 receives the profile data on line 364. The comparator controls the pulses on line 340 by the relationship of the waveform signal on line 364 and either the arc current or arc voltage on feedback input 344a. Waveform generator 352 is controlled by the waveform signal as digital data on line 370. The polarity at any given time is determined by the signal on line 372. Polarity circuit 374 outputs the gate pulse on line 330b to activate switch 330a so freewheeling diode 360 is active during the positive half cycle of the arc welding process being performed. Negative control system 380 is the same as system 350 to control the logic on line 342 by comparator 346 having a feedback input 346a. Waveform generator 382 has a set point potentiometer 384 and an output 386 for controlling pulse width modulator 390 operated at the frequency of oscillator 392 to create activation pulses in line 392a. The output 394 of pulse width modulator 390 controls the waveform on line 342 which gates negative power switch SW2. The selected stored program from module 224 produces a signal on line 396 to produce waveform B when operating negative switch SW2. The polarity of the pulse at any given time is a signal on line 398 that activates polarity circuit 399 to produce the gate signal on line 332b for operating the negative freewheeling diode 332a during the negative portion of the arc welding process. Welder 300 operates in accordance with the description in FIG. 1 utilizing selector device 220 and program in storage module 224 for outputting a waveform signal and a polarity signal to implement a desired type of electric arc welding process with the desired polarity characteristics. Thus, the invention is used in a three stage power source type arc welder shown in FIG. 1 or the AC/DC type welder shown in FIG. 2.

Figure 3:
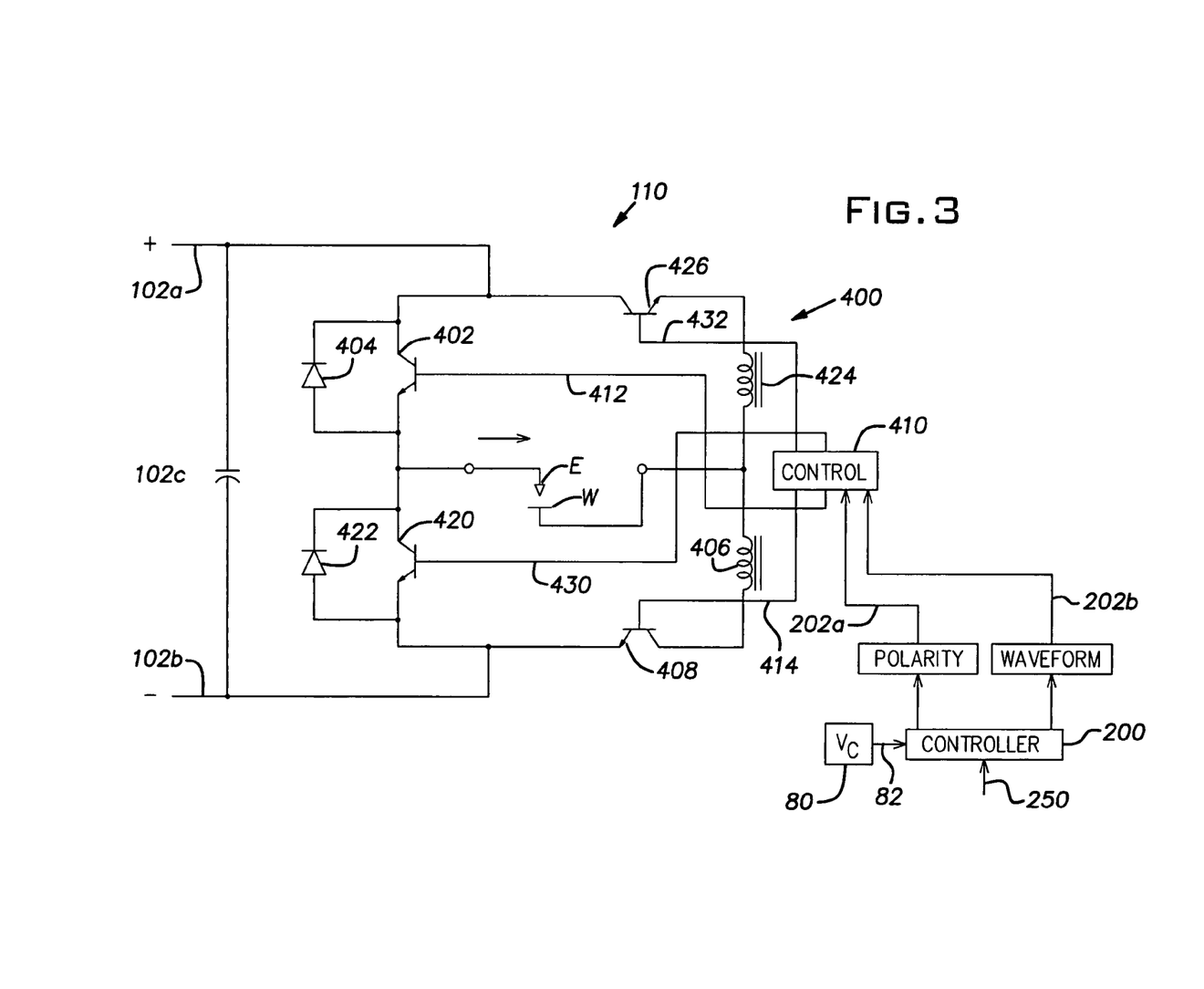
FIG. 3 is a wiring diagram and block diagram illustrating a dual mode chopper for the output stage of the power source for an electric arc welder employing the preferred embodiment of the present invention as illustrated in FIG. 1; and, FIG. 4 is a further electric arc welder of the type having a power source with an inverter output stage, which welder is modified to employ the selector device constructed in accordance with the present invention to control the pulse width modulator to the inverter, as well as the polarity of the waveforms being used in the electric arc welding process.

In the preferred and practical implementation of the present invention, weld control stage 110 shown in FIG. 1 is a dual mode chopper as shown in FIG. 3. Such chopper is not prior art in the welding industry. Chopper 110 has input leads 102a, 102b and a filter capacitor 102c for driving dual mode chopper 400. The chopper has a path for positive waveforms which path includes power switch 402 having an anti-parallel diode 404 and an inductor section 406 with a polarity switch 408. Controller 410 creates a waveform signal in line 412 to operate positive power switch 402 according to the pulses from a pulse width modulator to determine the profile of the welding waveform. The signal on line 414 is the trigger for polarity switch 408, which switch is closed as the positive waveform is processed by power switch 402 under control of logic on line 202b during the positive portion of the welding process. The negative path for dual mode chopper 400 includes power switch 420 having an anti-parallel diode 422 and an inductor 424 with a plurality switch 426. Controller 410 produces the necessary waveform profile on line 430 to control the operation of power switch 420. While the switch is operated to produce the desired waveform profile, switch 426 is closed by a logic on line 432. Thus, the dual mode chopper 400 is operated in accordance with the description of FIG. 1 when it is used as the output weld stage 110 having feedback control signals.

Figure 4:
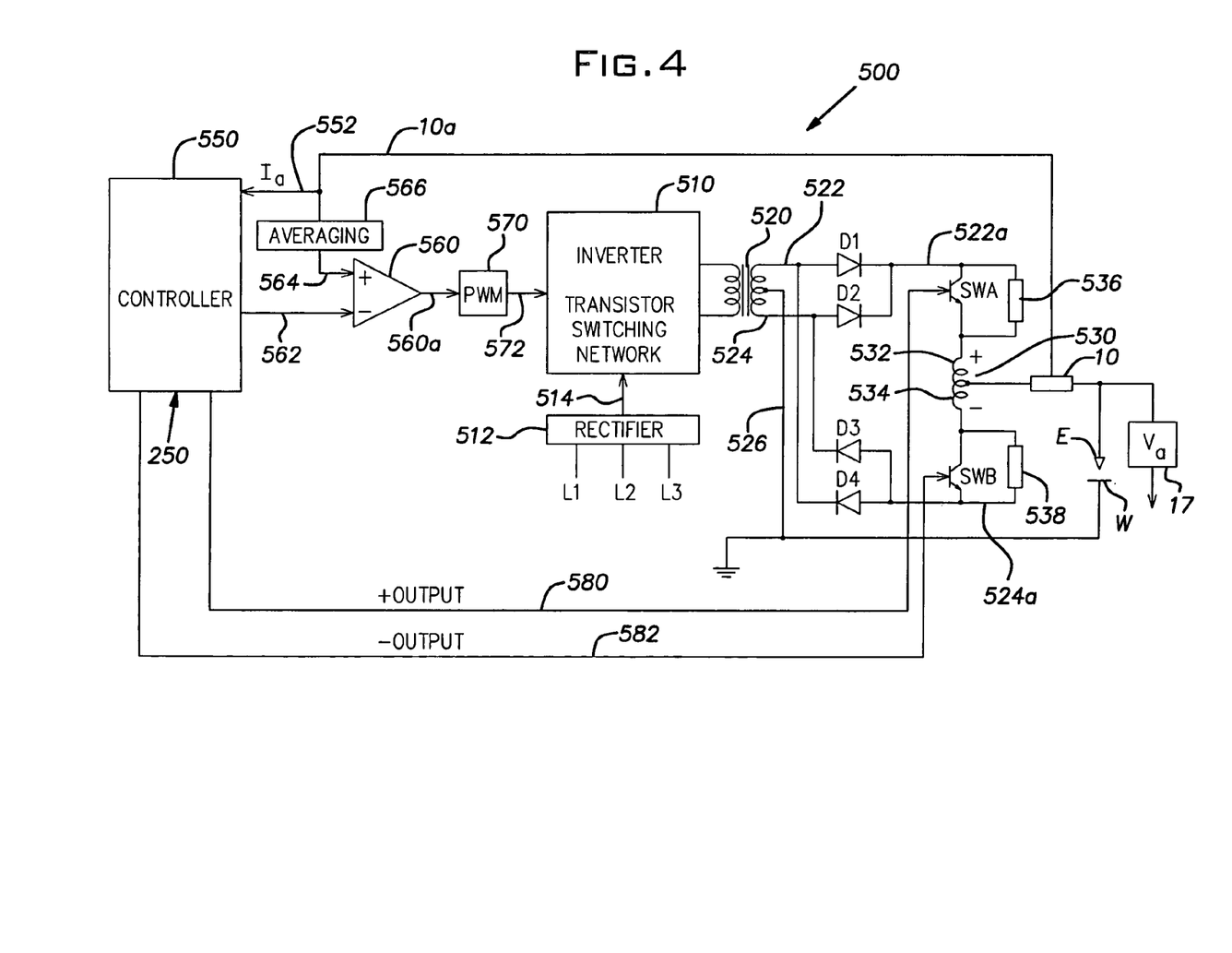

The selector device of the present invention is used with welder 500 operated by a standard inverter type power source 510 where rectifier 512 produces a DC signal on line 514 directed to inverter 510. The inverter produces a waveform by using output isolation transformer 520 having a positive output lead 522 and a negative output lead 524 with a center grounded lead 526. Diodes D1-D4 produce a positive potential on line 522a and a negative potential on line 524a. Center tap inductor 530 has positive section 532a operated in unison with positive switch SWA having a snubber 536. Negative section 534 operates in unison with negative switch SWB having snubber 538. The waveform through switches SWA and SWB is controlled by the logic on input line 250 from selector device 220, as shown in FIG. 1. This signal is directed to controller 550 having an output waveform profile signal on line 562. This signal is directed to the input of comparator 560 having a second input 564 which is feedback current on line 10a averaged by circuit 566. The waveform profile on line 562 is compared to the actual current on line 564 by comparator 560 to create a waveform signal on line 560a at the input of pulse width modulator 570. The output of the pulse width modulator is a series of rapid pulses at a rate greater than 20 kHz on line 572 which line signal controls the pulse width modulator during the positive and negative portions of the welding process. The logic on line 580 closes positive power switch SWA during the positive portion of the welding process. During this portion, inverter 510 produces the desired waveform by a series of pulses from transformer 520. In a like manner, a signal on line 582 closes negative power switch SWB so the inverter produces the desired negative waveform in the form of a plurality of pulses from transformer 520. As shown in FIG. 4, selector device 220 is used in an inverter type welder, as well as for the welder shown in FIG. 2 or the welder shown in FIG. 1 as modified by the output stage shown in FIG. 3.

Having thus defined the invention, the following is claimed:

1. An electric arc welder for creating an arc welding process between an electrode and a workpiece, said welder comprising:
 a preregulator having a first DC signal as an input and a regulated second DC signal as an output;
 an unregulated isolation inverter to convert said regulated second DC signal into a DC power signal;
 a weld control stage for converting said DC power signal into a welding signal;
 a selector device storing several selectable welding processes, each having a corresponding polarity;
 an auxiliary electrode selector module storing several selectable electrode types and diameters; and
 a controller for causing said weld control stage to conform said welding signal into a waveform to provide a welding process between said electrode and said workpiece, said controller having an output control signal regulated to produce a selected waveform or waveforms and a polarity of said selected waveform or waveforms based upon a selectable first output from said selector device and a selectable auxiliary output from said auxiliary electrode selector module,
 wherein said selectable first output includes one of said several selectable stored welding processes and said corresponding polarity, and
 wherein said selectable auxiliary output includes at least one of said several selectable electrode types and at least one of said several selectable diameters.

2. An electric arc welder as defined in claim 1 wherein said several processes include MIG, stick and subarc welding.

3. An electric arc welder as defined in claim 2 wherein said polarity outputted from said selector is selectable between AC and DC.

4. An electric arc welder as defined in claim 2 wherein said welder includes a wire feeder with a motor to control WFS by a WFS signal and said selector includes a circuit to create a WFS signal indicative of a desired WFS.

5. An electric arc welder as defined in claim 2 wherein said weld control stage is a dual mode chopper.

6. An electric arc welder as defined in claim 1 wherein said preregulator and said unregulated isolation inverter have a control voltage and a circuit to obtain said control voltage from said regulated second DC signal.

7. An electric arc welder as defined in claim 6 wherein said circuit is a buck converter.

8. An electric arc welder as defined in claim 6 wherein said polarity outputted from said selector is selectable between AC and DC.

9. An electric arc welder as defined in claim 6 wherein said welder includes a wire feeder with a motor to control WFS by a WFS signal and said selector includes a circuit to create a WFS signal indicative of a desired WFS.

10. An electric arc welder as defined in claim 6 wherein said weld control stage is a dual mode chopper.

11. An electric arc welder as defined in claim 6 wherein said preregulator is a power factor correcting stage.

12. An electric arc welder as defined in claim 1 wherein said polarity outputted from said selector is selectable between AC and DC.

13. An electric arc welder as defined in claim 12 wherein said welder includes a wire feeder with a motor to control WFS by a WFS signal and said selector includes a circuit to create a WFS signal indicative of a desired WFS.

14. An electric arc welder as defined in claim 12 wherein said weld control stage is a dual mode chopper.

15. An electric arc welder as defined in claim 12 wherein said preregulator is a power factor correcting stage.

16. An electric arc welder as defined in claim 1 wherein said welder includes a wire feeder with a motor to control WFS by a WFS signal and said selector includes a circuit to create a WFS signal indicative of a desired WFS.

17. An electric arc welder as defined in claim 16 wherein said weld control stage is a dual mode chopper.

18. An electric arc welder as defined in claim 16 wherein said preregulator is a power factor correcting stage.

19. An electric arc welder as defined in claim 1 wherein said weld control stage is a dual mode chopper.

20. An electric arc welder as defined in claim 19 wherein said preregulator is a power factor correcting stage.

21. An electric arc welder as defined in claim 2 wherein said preregulator is a power factor correcting stage.

22. An electric arc welder as defined in claim 1 wherein said preregulator is a power factor correcting stage.

23. An electric arc welder for creating an arc welding process between an electrode and a workpiece, said welder comprising:
 a preregulator having a first DC signal as an input and a regulated second DC signal as an output;
 a weld control stage in the form of a dual mode chopper for using said regulated second DC signal to create a welding signal;
 a selector device storing several selectable welding processes, each having a corresponding polarity;
 an auxiliary electrode selector module storing several selectable electrode types and diameters; and
 a controller for causing said weld control stage to conform said welding signal into a waveform to provide a welding process between said electrode and said workpiece, said controller having an output control signal regulated to produce a selected waveform or waveforms and the polarity of said selected waveform or waveforms based upon a selectable first output from said selector device and a selectable auxiliary output from said auxiliary electrode selector module,
 wherein said selectable first output includes one of said several selectable welding processes and said corresponding polarity, and
 wherein said selectable auxiliary output includes at least one of said several selectable electrode types and at least one of said several selectable diameters.

24. An electric arc welder as defined in claim 23 wherein said several processes include MIG, stick and subarc welding.

25. An electric arc welder for creating an arc welding process between an electrode and a workpiece, said welder comprising:
 a preregulator having a first DC signal as an input and a regulated second DC signal as an output;
 a weld control stage in the form of a high switching speed inverter for using said regulated second DC signal to create a welding signal;
 a selector device storing several selectable welding processes, each having a corresponding polarity;

an auxiliary electrode selector module storing several selectable electrode types and diameters; and a controller for causing said weld control stage to conform said welding signal into a waveform to provide a welding process between said electrode and said workpiece, said controller having an output control signal regulated to produce a selected waveform or waveforms and the polarity of said selected waveform or waveforms based upon a selectable first output from said selector device and a selectable auxiliary output from said auxiliary electrode selector module, wherein said selectable first output includes one of said several selectable welding processes and said corresponding polarity, and wherein said selectable auxiliary output includes at least one of said several selectable electrode types and at least one of said several selectable diameters.

26. An electric arc welder as defined in claim 25 wherein said several processes include MIG, stick and subarc welding.

27. A selector device for an electric arc welder to perform a welding process according to a waveform signal and a polarity signal directed to a controller, said selector device comprising:

a program stored on a computer readable medium to select one of several stored sets of waveform signals and polarity signals comprising a given one of several welding processes, a circuit to output said waveforms signals and polarity signals from said selector device to said controller, and an auxiliary electrode selector module storing several selectable electrode types and diameters;

wherein said auxiliary electrode selector module includes a selectable auxiliary output that includes at least one of said several selectable electrode types and at least one of said several selectable diameters.

28. A selector device as defined in claim 27 wherein several processes include MIG, stick and subarc welding.

29. An electric arc welder for creating an arc welding process between an electrode and a workpiece, said welder comprising:

an inverter having a first DC signal as an input and a regulated second DC signal as an output;

a weld control stage in the form of a high switching speed inverter for using said regulated second DC signal to create a welding signal;

a selector device storing several selectable welding processes, each having a corresponding polarity;

an auxiliary electrode selector module storing several selectable electrode types and diameters; and a controller for causing said weld control stage to conform said welding signal into a waveform to provide a welding process between said electrode and said workpiece, said controller having an output control signal regulated to produce a selected waveform or waveforms and the polarity of said selected waveform or waveforms based upon a selectable first output from said selector device and a selectable auxiliary output from said auxiliary electrode selector module, wherein said selectable first output includes one of several selectable welding processes and said corresponding polarity for outputting by said controller, and wherein said selectable auxiliary output includes at least one of said several selectable electrode types and least one of said several selectable diameters.

* * * * *

UNITED STATES PATENT AND TRADEMARK OFFICE
CERTIFICATE OF CORRECTION

PATENT NO. : 8,975,558 B2  
APPLICATION NO. : 11/114683  
DATED : March 10, 2015  
INVENTOR(S) : Elliot K. Stava and William T. Matthews It is certified that error appears in the above-identified patent and that said Letters Patent is hereby corrected as shown below:

In the Claims

Col. 10, lines 30-31, Claim 29, add --at-- before "least one of said several selectable diameters."

Signed and Sealed this
Eighteenth Day of August, 2015

Michelle K. Lee
*Director of the United States Patent and Trademark Office*